(12) United States Patent
Shimizu

(10) Patent No.: US 11,418,645 B2
(45) Date of Patent: Aug. 16, 2022

(54) TELEPHONE EXCHANGE, HOLD TONE NOTIFICATION METHOD, AND HOLD TONE NOTIFICATION PROGRAM

(71) Applicant: NEC Platforms, Ltd., Kawasaki (JP)

(72) Inventor: Yosuke Shimizu, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/275,804

(22) PCT Filed: Aug. 30, 2019

(86) PCT No.: PCT/JP2019/034131
§ 371 (c)(1),
(2) Date: Mar. 12, 2021

(87) PCT Pub. No.: WO2020/054461
PCT Pub. Date: Mar. 19, 2020

(65) Prior Publication Data
US 2022/0053089 A1 Feb. 17, 2022

(30) Foreign Application Priority Data
Sep. 13, 2018 (JP) .............................. JP2018-171061

(51) Int. Cl.
*H04M 3/428* (2006.01)
*G10L 15/00* (2013.01)

(52) U.S. Cl.
CPC ......... *H04M 3/4285* (2013.01); *G10L 15/005* (2013.01); *H04M 2203/2061* (2013.01)

(58) Field of Classification Search
CPC ............ H04M 3/4285; H04M 2242/12; G10L 15/005
(Continued)

(56) References Cited

U.S. PATENT DOCUMENTS

| 5,058,167 A | 10/1991 | Kimura |
| 2007/0116227 A1 | 5/2007 | Vitenson et al. |

(Continued)

FOREIGN PATENT DOCUMENTS

| EP | 1379066 A2 | 1/2004 |
| JP | H01-112299 A | 4/1989 |

(Continued)

OTHER PUBLICATIONS

International Search Report for PCT Application No. PCT/JP2019/034131, dated Oct. 1, 2019.
(Continued)

*Primary Examiner* — Ahmad F. Matar
*Assistant Examiner* — Jirapon Intavong
(74) *Attorney, Agent, or Firm* — Sughrue Mion, PLLC

(57) ABSTRACT

A recognition analysis processing unit (20) analyzes call voice information about a call between terminals, which are in a communicating state, specifies a language used in the call voice information, and stores the language as language information. When a hold request detection unit (11) detects a hold request signal for requesting that the call to be held transmitted from one of the call originating terminal and the call receiving terminal, which are in the communicating state, to be held, it extracts, from the language information stored in the recognition analysis processing unit (20), the language used in the call between the terminals to which the hold request signal has been transmitted from the one of the terminals, selects, from a hold tone database (30) storing the hold tones including a plurality of on-hold messages in various languages, the hold tone including the on-hold message in the language matching the extracted language, and transmits the selected hold tone to another one of the terminals, which is another party on the phone. Thus, a telephone exchange (1000) for making the other party on the (Continued)

phone listen to the hold tone including the on-hold message in the language matching the language used by the other party on the phone is provided.

6 Claims, 3 Drawing Sheets

(58) Field of Classification Search
USPC .................................................. 379/201.01
See application file for complete search history.

(56) References Cited

U.S. PATENT DOCUMENTS

| | | | |
|---|---|---|---|
| 2008/0219415 A1 | 9/2008 | Jang et al. | |
| 2009/0220056 A1* | 9/2009 | Simpson | H04M 3/493 379/88.03 |
| 2018/0124238 A1* | 5/2018 | Shah | H04M 3/4285 |

FOREIGN PATENT DOCUMENTS

| | | |
|---|---|---|
| JP | H10-243064 A | 9/1998 |
| JP | 2001-024786 A | 1/2001 |
| JP | 2003-319424 A | 11/2003 |
| JP | 2006-121611 A | 5/2006 |
| JP | 2010-074780 A | 4/2010 |
| JP | 2011-082794 A | 4/2011 |
| JP | 2011-217018 A | 10/2011 |
| KR | 10-2008-0112771 A | 12/2008 |

OTHER PUBLICATIONS

Japanese Office Action for Application No. 2018-171061 dated Oct. 29, 2019.
Japanese Decision to Grant a Patent for Application No. 2019-226646 dated Dec. 8, 2020.
Australian Office Action for AU Application No. 2019338745 dated Oct. 7, 2021.
Chinese Office Action for CN Application No. 201980059162.3 dated Jan. 17, 2022 with English Translation.

* cited by examiner

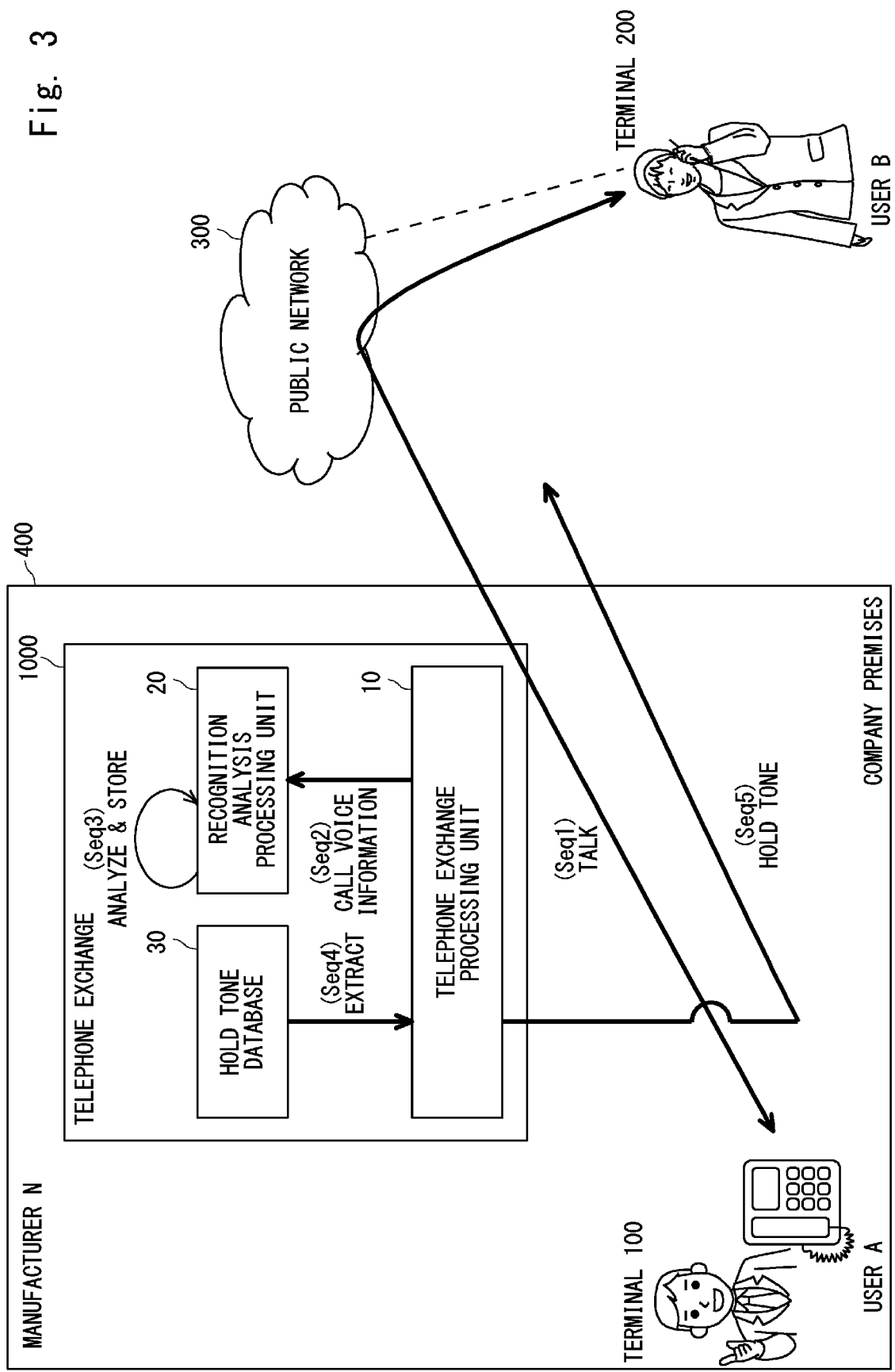

TELEPHONE EXCHANGE, HOLD TONE NOTIFICATION METHOD, AND HOLD TONE NOTIFICATION PROGRAM

This application is a National Stage Entry of PCT/JP2019/034131 filed on Aug. 30, 2019, which claims priority from Japanese Patent Application 2018-171061 filed on Sep. 13, 2018, the contents of all of which are incorporated herein by reference, in their entirety.

TECHNICAL FIELD

The present disclosure relates to a telephone exchange, a hold tone notification method, and a hold tone notification program, and more particularly to a telephone exchange, a hold tone notification method, and a hold tone notification program having a function of notifying the other party on the phone of a hold tone when a call is put on hold.

BACKGROUND ART

As existing techniques, for example, as described in Japanese Unexamined Patent Application Publication No. 2001-024786 "Holding apparatus for telephone set and advertisement method using the same" of Patent Literature 1, it has been proposed that a telephone exchange include a holding apparatus which puts a telephone call on hold and has the other party on the phone (i.e., the person on hold) listen to an on-hold message composed of voice information as a hold tone while making the other party on the phone wait.

Further, as described in, for example, Japanese Unexamined Patent Application Publication No. 2003-319424 "Hold tone transmission system and transmission method" of Patent Literature 2, it has been proposed that a telephone exchange include a on-hold message transmission system that selects a on-hold message for advertising a product expected to be of interest to a caller based on customer data associated with a caller ID and transmits the on-hold message to the caller (the person on hold).

CITATION LIST

Patent Literature

Patent Literature 1: Japanese Unexamined Patent Application Publication No. 2001-024786
Patent Literature 2: Japanese Unexamined Patent Application Publication No. 2003-319424

SUMMARY OF INVENTION

However, in all the existing techniques related to the present disclosure, including the techniques described in the aforementioned Patent Literature 1 and 2, there is a limitation to a mechanism of reproducing a sound source in which a on-hold message composed of voice information has been recorded in advance. In the existing techniques related to the present disclosure, including the techniques described in the aforementioned Patent Literature 1 and 2, although the sound source for transmitting the on-hold message can be changed between a sound source during business hours and a sound source outside of business hours by, for example, setting a time, the on-hold message is not automatically selected and transmitted in a language matching the language of the other party on the phone who is to listen to the on-hold message.

In other words, in the present telephone exchange, there has been a situation in which it is impossible to realize a technique of flexibly selecting a hold tone sound source corresponding to the language used by the other party on the phone (the person on hold) who is to listen to the on-hold message and providing the hold tone sound source to the other party on the phone (the person on hold). In many cases, the hold tone sound source for the on-hold messages used at present transmits the information about the products and promotes the company, and so on. In the present business environment, the on-hold message included in the hold tone is effective, if only slightly, as one of the promotion tools of the company, and many companies have employed such on-hold messages.

In particular, with the rapid progress of globalization, communication with people from foreign countries who speak different languages has become a very important factor in business. In addition to text-based communication such as e-mails and short messages, communication in a variety of languages through voice calls has become essential. In spite of such a situation, the language of the on-hold message (the on-hold message included in the hold tone), which is likely to help generate business opportunities, is fixed to a specific language in the above-described existing techniques. When the language of the on-hold message is fixed to a specific language, if the language of the on-hold message is different from the language used by the customer on the phone, the customer will not understand the content of the on-hold message, and thus the expected effect cannot be achieved. In other words, in the existing techniques, a mechanism in which the telephone exchange automatically determines the language of the other party on the phone who is to listen to the on-hold message, namely, the person on hold, so that the other party on the phone can listen to the on-hold message in the language corresponding to the language used by him/her has not been realized. Thus, as described above, the problem that remains to be solved in the existing techniques is to realize a mechanism for making the other party on the phone listen to the on-hold message in a language corresponding to the language used by him/her.
(Purpose of this Disclosure)

An object of the present disclosure is to provide a telephone exchange, a hold tone notification method, and a hold tone notification program for automatically selecting a on-hold message in a language corresponding to a language used by the other party on the phone, namely, a person on hold, and making the other party on the phone, namely, the person on hold, listen to the selected on-hold message.

In order to solve the above-described problem, a telephone exchange, a hold tone notification method, and a hold tone notification program according to the present disclosure mainly employ the following characteristic configurations.

(1) A telephone exchange according to the present disclosure includes:

a hold tone database configured to store hold tones including a plurality of on-hold messages in various languages in advance;

a telephone exchange processing unit configured to control incoming and outgoing call operations of a call originating terminal and a call receiving terminal, control a call between the call originating terminal and the call receiving terminal, and notify one of the call originating terminal and the call receiving terminal of the hold tone, the call originating terminal and the call receiving terminal being in a communicating state;

a recognition analysis processing unit configured to analyze call voice information about the call between the call originating terminal and the call receiving terminal, which are in the communicating state, specify a language used in the call voice information, and store the language as language information; and a hold request detection processing unit configured to detect a hold request signal for requesting that the call to be held transmitted from one of the call originating terminal and the call receiving terminal, which are in the communicating state, to be held.

When the hold request detection processing unit detects the hold request signal transmitted from one of the call originating terminal and the call receiving terminal, which are in the communicating state, the hold request detection processing unit extracts, from the language information stored in the recognition analysis processing unit, the language used in the call between the call originating terminal and the call receiving terminal to which the hold request signal has been transmitted from the one of the call originating terminal and the call receiving terminal, selects, from the hold tone database, the hold tone including the on-hold message in the language matching the language extracted by the telephone exchange processing unit, and transmits the selected hold tone to another one of the call originating terminal and the call receiving terminal, which is another party on the phone in the call with the one of the call originating terminal and the call receiving terminal.

(2) A hold tone notification method according to the present disclosure includes:

a hold tone database configured to store hold tones including a plurality of on-hold messages in various languages in advance;

a telephone exchange processing step of controlling incoming and outgoing call operations of a call originating terminal and a call receiving terminal, controlling a call between the call originating terminal and the call receiving terminal, and notifying one of the call originating terminal and the call receiving terminal of the hold tone, the call originating terminal and the call receiving terminal being in a communicating state;

a recognition analysis processing step of analyzing call voice information about the call between the call originating terminal and the call receiving terminal, which are in the communicating state, specifying a language used in the call voice information, and storing the language as language information; and a hold request detection processing step of detecting a hold request signal for requesting that the call to be held transmitted from one of the call originating terminal and the call receiving terminal, which are in the communicating state, to be held.

In the hold request detection processing step, when the hold request signal transmitted from one of the call originating terminal and the call receiving terminal, which are in the communicating state, is detected, the language used in the call between the call originating terminal and the call receiving terminal to which the hold request signal has been transmitted from the one of the call originating terminal and the call receiving terminal is extracted from the language information stored in the recognition analysis processing step, the hold tone including the on-hold message in the language matching the language extracted in the telephone exchange processing step is selected from the hold tone database, and the selected hold tone is transmitted to another one of the call originating terminal and the call receiving terminal, which is another party on the phone in the call with the one of the call originating terminal and the call receiving terminal.

(3) A hold tone notification program according to the present disclosure operated on a computer including a hold tone database configured to store hold tones including a plurality of on-hold messages in various languages in advance causes the computer to execute:

a telephone exchange processing process of controlling incoming and outgoing call operations of a call originating terminal and a call receiving terminal, controlling a call between the call originating terminal and the call receiving terminal, and notifying one of the call originating terminal and the call receiving terminal of the hold tone, the call originating terminal and the call receiving terminal being in a communicating state;

a recognition analysis processing process of analyzing call voice information about the call between the call originating terminal and the call receiving terminal, which are in the communicating state, specifying a language used in the call voice information, and storing the language as language information; and a hold request detection processing process of detecting a hold request signal for requesting that the call to be held transmitted from one of the call originating terminal and the call receiving terminal, which are in the communicating state, to be held.

In the hold request detection processing process, when the hold request signal transmitted from one of the call originating terminal and the call receiving terminal, which are in the communicating state, is detected, the language used in the call between the call originating terminal and the call receiving terminal to which the hold request signal has been transmitted from the one of the call originating terminal and the call receiving terminal is extracted from the language information stored in the recognition analysis processing process, the hold tone including the on-hold message in the language matching the language extracted in the telephone exchange processing process is extracted from the hold tone database, and the selected hold tone is transmitted to another one of the call originating terminal and the call receiving terminal, which is another party on the phone in the call with the one of the call originating terminal and the call receiving terminal.

According to the telephone exchange, the hold tone notification method, and the hold tone notification program of the present disclosure, the following effects can be achieved.

More specifically, for example, by implementing the recognition analysis processing unit (i.e., the voice recognition module), which specifies the language of the call voice information, in the telephone exchange installed in the company premises, when the telephone exchange transmits the hold tone to the terminal of the other party on the phone which accesses the terminal on the company side, i.e., the terminal used by the user on the customer side, it is possible to transmit, to the terminal of the user on the customer side, the hold tone including the on-hold message in the language used in the call by the user on the customer side to talk with the user who is a user of the terminal on the company side. Thus, for example, when the content of the on-hold message included in the hold tone is the advertisement or business appeal of the company which is holding the call, the customer who is the person on hold can correctly understand the content of the on-hold message included in the hold tone.

BRIEF DESCRIPTION OF DRAWINGS

FIG. 3 is an explanatory diagram for explaining an example of an operation of the telephone exchange shown in FIG. 1.

DESCRIPTION OF EMBODIMENTS

Figure 1:
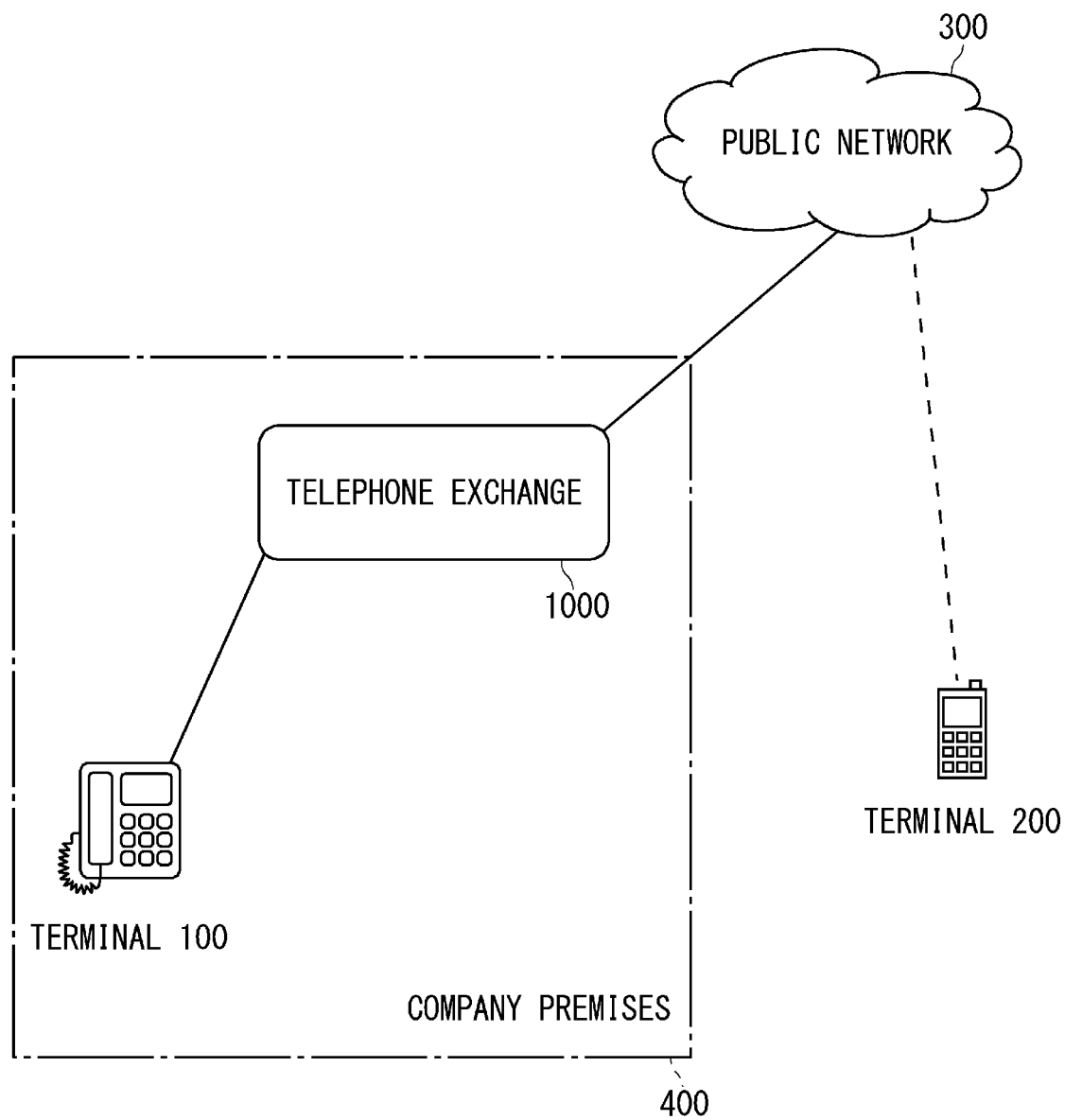
FIG. 1 is a network configuration diagram showing an example of a connection configuration of a telephone exchange according to the present disclosure.

Hereinafter, a preferred example embodiment of a telephone exchange, a hold tone notification method and a hold tone notification program according to the present disclosure will be described with reference to the accompanying drawings. Although the telephone exchange and the hold tone notification method according to the present disclosure will be described in the following description, it is needless to say that the hold tone notification method may be implemented as a hold tone notification program executable by a computer, or the hold tone notification program may be recorded on a recording medium readable by a computer. In addition, the reference signs provided in the drawings in the following descriptions are added to the respective elements for convenience as an example in order to facilitate understanding, and it is needless to say that the present disclosure is not intended to be limited to the illustrated example embodiment.

(Features of the Present Disclosure)

Prior to the description of the example embodiment of the present disclosure, the features of the present disclosure will first be outlined. The main features of the present disclosure are that the telephone exchange includes a voice recognition module (i.e., a recognition analysis processing unit) for automatically identifying a language used by the other party on the phone (a person on hold) who is to listen to a hold tone and when the hold tone is notified to the other party on the phone, the hold tone including a on-hold message in a language matching the identified language is automatically transmitted. That is, according to the present disclosure, by analyzing and specifying the voice used by the other party on the phone who is to listen to the hold tone, the language of the on-hold message included in the hold tone to be notified to the other party on the phone can be automatically selected and transmitted. This makes it possible to make the other party on the phone listen to the understandable on-hold message, thereby improving the functionality of the hold tone compared with that of the present telephone exchange.

The details are described below. A main feature of the present disclosure is that the telephone exchange includes the voice recognition module (i.e., the recognition analysis processing unit) for analyzing a call voice and specifying a language used in the call voice and hold tone sound sources including the on-hold messages in various languages, and when a call with the other party on the phone is put on hold, the hold tone sound source including the on-hold message in the language understandable for the other party on the phone is transmitted to the other party on the phone, so that the other party on the phone can correctly understand the contents of the message included in the hold tone sound source.

Since a call is always made between a call originating user and a call receiving user who are set to a communicating state by the telephone exchange using some language, the telephone exchange can reliably acquire call voice information about voices spoken by each user on the phone. Thus, the telephone exchange can analyze the call voice information of the other party on the phone by the voice recognition module (i.e., the recognition analysis processing unit) mounted inside the telephone exchange, and specify the language of the call.

As a result, in preparation for the time when the other party on the phone transitions to the holding state, the telephone exchange can search for a hold tone sound source using the same kind of language as that of the language used in the call from among the hold tone sound sources (the hold tone sound sources including the on-hold messages in various languages) stored inside the telephone exchange in advance, using the language specified as the language used by the other party on the phone, to which the hold tone sound source is to be transmitted, as a search key, so that the hold tone sound source in this language can be uniquely selected.

Therefore, when the other party on the phone enters the holding state due to some factor and becomes the person on hold listening to the hold tone sound source, the telephone exchange transmits the hold tone sound source in the uniquely selected language to the person on hold who is the person on the phone, so that the person on hold who is the other party on the phone can correctly understand the on-hold message included in the transmitted hold tone sound source.

(Configuration Examples of Example Embodiment of the Present Disclosure)

Next, a configuration example of the telephone exchange according to the present disclosure will be described in detail with reference to the drawings. FIG. 1 is a network configuration diagram showing an example of a connection configuration of the telephone exchange according to the present disclosure, and explains a case where a telephone exchange 1000 is installed in company premises 400 as a private branch telephone exchange that can be connected to the public network 300 as an outside call. In the network configuration diagram of FIG. 1, a terminal 100 is an extension telephone (e.g., a multifunction telephone) of a company accommodated in the telephone exchange 1000, and can be connected to the public network 300 as an outside call via the telephone exchange 1000.

A terminal 200 is a telephone that can be connected to the public network 300. In the example shown in FIG. 1, the terminal 200 is a privately owned cellular phone wirelessly connected via a base station in the public network 300. In the following description, a case where a user of the terminal 100 on the company side and a user of the terminal 200 on the customer side talk via the telephone exchange 1000 and the public network 300 will be described.

Figure 2:
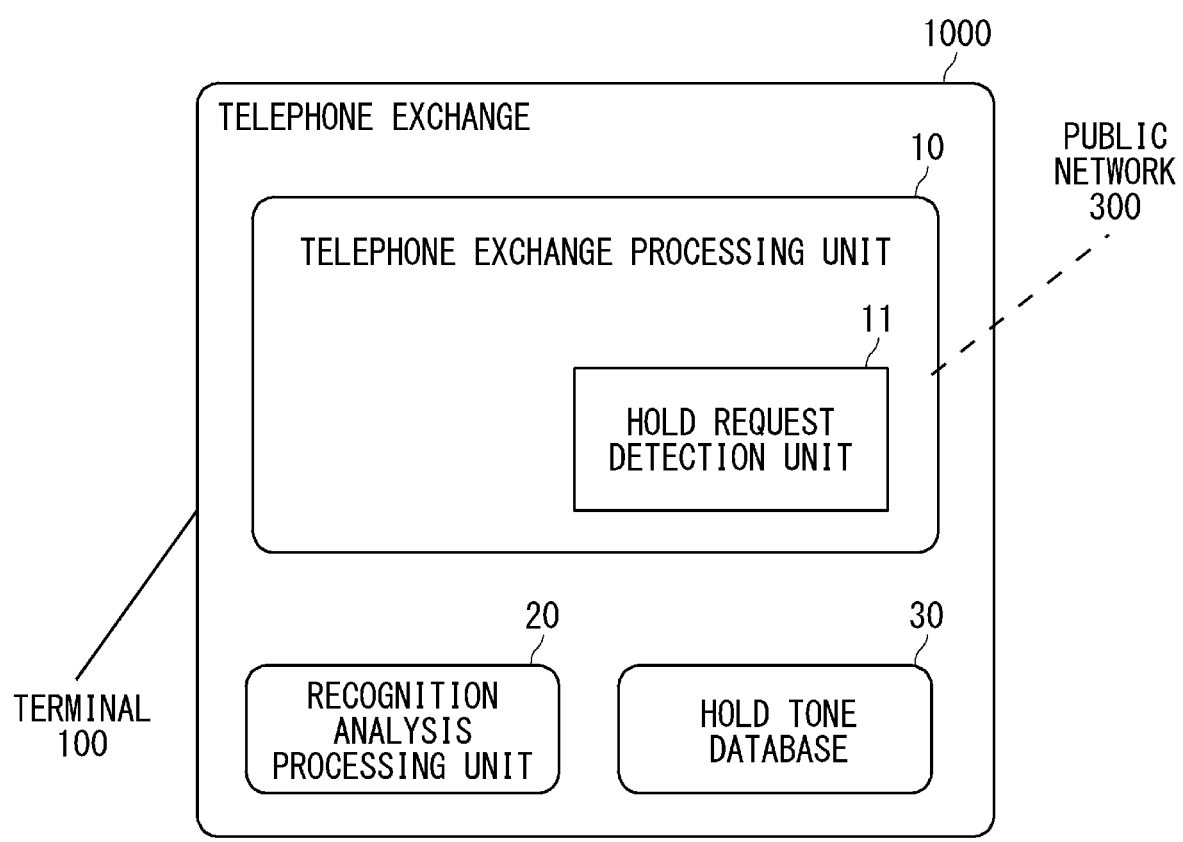
FIG. 2 is a block diagram showing an example of a main part of the telephone exchange shown in the network configuration diagram of FIG. 1.

FIG. 2 is a block diagram showing an example of a main part of the telephone exchange 1000 shown in the network configuration diagram of FIG. 1. As shown in the telephone exchange 1000 of FIG. 2, the telephone exchange 1000 includes at least a telephone exchange processing unit 10, a recognition analysis processing unit 20, and a hold tone database 30.

The telephone exchange processing unit 10 is a processing unit that controls the entire processing of the telephone exchange 1000. The telephone exchange processing unit 10 includes at least a function of extracting the call voice information about the call being made between the user of the terminal 100 and the user of the terminal 200, and a a hold request detection unit 11 for detecting that a hold request signal is transmitted from one of the terminals 100 and 200 which are in a communicating state. The hold request signal indicates a request to put a call on hold.

The recognition analysis processing unit 20 is a voice recognition module that performs processing of analyzing the call voice information transmitted from the terminal 200, which is used by the other party on the phone, or the call voice information transmitted from the terminal 100 via the public network 300 from among the call voice information items about the call being made between the user of the terminal 100 and the user of the terminal 200 extracted by the telephone exchange processing unit 10 and automatically identifying the language used in the speech voice information. The hold tone database 30 stores hold tones including a plurality of on-hold messages in various conceivable languages.

(Description of Operation of Example Embodiment of the Present Disclosure)

Next, an example of an operation of the telephone exchange 1000 shown in FIGS. 1 and 2 will be described. The example is that, when a user A of the terminal 100, which is the extension telephone in the company premises 400, is talking on the phone with a user B, who is the other party on the phone, of the terminal 200 connected via the public network 300, and the user A of the terminal 100 puts the call with the user B on hold due to some factor, the telephone exchange 1000 notifies the hold tone to the user B (the person on hold), who is the other party on the phone being held, of the terminal 200. A procedure of notifying the user B of the hold tone will be described below. Here, the telephone exchange 1000 is installed in the premises 400 of a company manufacturer N, and the user A who is using the terminal 100 on the company side which is connected as an extension to the telephone exchange 1000 is making a voice call to the user B who is the customer using the terminal 200 on the customer side outside the premises via the telephone exchange 1000 and the public network 300.

FIG. 3 is an explanatory diagram for explaining an example of the operation of the telephone exchange 1000 shown in FIG. 1. As described above, the telephone exchange 1000 installed in the premises 400 of the manufacturer N is connected to the terminal 100 in the company such as a multifunctional telephone set as an extension used by the user A of the manufacturer N, and connected to the public network 300 as an outside call. The terminal 100 used by the user A of the manufacturer N is connected to the terminal 200 such as a cellular phone used by the user B who is the customer and the other party on the phone via the telephone exchange 1000 and the public network 300, and the user A on the company side and the user B on the customer side are talking on the phone. Here, the explanatory diagram of FIG. 3 schematically explains the following procedure with sequence numbers (Seqx: x is a number). The procedure is, when the user A on the company side is talking on the phone with the user B on the customer side, the holding state in which the call of the user B who is the customer is put on hold occurs due to some factor, and the telephone exchange 1000 automatically transmits, to the user B (the person on hold) who is the other party on the phone, the hold tone including the on-hold message in the language used by the user B.

In FIG. 3, as described with reference to FIG. 2, the telephone exchange 1000 includes at least the telephone exchange processing unit 10 for controlling various processes of the telephone exchange 1000, the recognition analysis processing unit 20 for analyzing voice information while the users of the terminals are talking on the phone and specifying the language being used, and the hold tone database 30 for previously storing the hold tones including a plurality of on-hold messages in various languages. Here, a default value related to the hold tone in the telephone exchange 1000 may be set for Japan, and the language of the on-hold message included in the hold tone may be set to Japanese. The content of the on-hold message may be previously stored in the hold tone database 30 in the telephone exchange 1000 as, for example, an advertisement message about the latest product of the manufacturer N which has installed the telephone exchange 1000 in its premises 400. In this example embodiment, it is assumed that the user B using the terminal 200 on the customer side is a foreigner using English as the language, and the user A of the terminal 100 and the user B of the terminal 200 talk in English.

First, in the explanatory diagram of FIG. 3, the telephone exchange processing unit 10 in the telephone exchange 1000 makes a telephone connection between the user A of the terminal 100 and the user B of the terminal 200, and transitions to a state of monitoring the call between the user A of the terminal 100 and the user B of the terminal 200 (Sequence Seq1).

Here, when the telephone exchange processing unit 10 detects the call between the user A of the terminal 100 and the user B of the terminal 200, it extracts the call voice information of the user B of the terminal 200 and notifies the extracted call voice information to the recognition analysis processing unit 20 (Sequence Seq2).

Each time the recognition analysis processing unit 20 receives the call voice information of the user B of the terminal 200 about the call being made with the user A of the terminal 100 from the telephone exchange processing unit 10, the recognition analysis processing unit analyzes the call voice information, specifies the language used in the call voice information, and sequentially stores it as the voice information (Sequence Seq3). In this example embodiment, as described above, it is assumed that the user B is talking with the user A in English, and therefore, the language information indicating the specified language indicates English.

After that, when the user A of the terminal 100 recognizes that a situation that requires the call with the user B, who is the customer, to be put on hold has occurred due to some factor, the terminal 100 transmits the hold request signal to the telephone exchange 1000. The telephone exchange 1000 receives the hold request signal from the terminal 100, and then the hold request detection unit 10 in the telephone exchange processing unit 11 detects the hold request signal. When the hold request signal from the terminal 100 is detected, the telephone exchange processing unit 10 in the telephone exchange 1000 first refers to the language information, which is stored in the recognition analysis processing unit 20, related to the language used in the call with the user B who is the other party on the phone, and confirms that the language used in the call between the user B, who is the customer and the other party on the phone, and the user A is English. Thus, the telephone exchange processing unit 10 searches for the hold tone including the on-hold message in English from among the plurality of hold tones previously stored in the hold tone database 30, and extracts the searched hold tone (the hold tone including the on-hold message in English) (Sequence Seq4).

After that, the telephone exchange processing unit 10 in the telephone exchange 1000 sets the hold tone extracted from the hold tone database 30 (the hold tone including the English on-hold message) in an announcement apparatus for sending the hold tone, and changes the connection state of the terminal 200, which is set in the communicating state with the terminal 100, so as to connect to the announcement apparatus. By doing so, the hold tone including the English on-hold message can be sent to the terminal 200 used by the user B who is the customer (Sequence Seq5).

After that, until the holding state is released, the telephone exchange processing unit 10 in the telephone exchange 1000 continues the operation of transmitting the hold tone including the English on-hold message to the user B who is the customer. When the telephone exchange processing unit 10 in the telephone exchange 1000 receives a notification of releasing the holding state from the terminal 100, the telephone exchange processing unit 10 changes the connection state with the terminal 200, releases the connection with the announcement apparatus which sends the hold tone, restores the connection state with the terminal 100, and returns to the call connection state with the terminal 100.

In the Sequence Seq4 described above, when the telephone exchange processing unit 10 in the telephone exchange 1000 refers to the information related to the language stored in the recognition analysis processing unit 20 to specify the language used by the user B to talk with the user A on the phone, and if there are a plurality of kinds of languages that the user B uses to talk with the user A on the phone, the language at the time closest to the time when the hold request signal is detected is extracted as the language used by the user B.

Further, in the above description of the operation, an example in which the recognition analysis processing unit 20 executes the operation of sequentially specifying the language used in the call by the user B who is the customer and storing it as the voice information regardless of whether or not the holding state in which the call is put on hold occurs while the users of the terminals are talking on the phone has been described. However, the present disclosure is not limited to this. For example, the recognition analysis processing unit 20 may specify the language used by the user B, who is the customer, in the call and store it as the language information in response to the occurrence of a situation where the user A of the terminal 100 has to put the call of the user B who is the customer on hold due to some factor. The terminal for transmitting the hold request signal may not be the terminal 100 and instead may be the terminal 200 on the customer side, as a matter of course. In this case, more specifically, when the user B of the terminal 200 on the customer side puts the call on hold, the hold tone is sent to the terminal 100 on the company side.

In other words, when the recognition analysis processing unit 20 performs the operation of specifying the language used in the call and storing the specified language as the language information in response to the occurrence of a situation where the call has to be put on hold, the telephone exchange processing unit 10 first stores the call voice information of the call originating and call receiving terminals (the terminals 100 and 200), which are in the communicating state, as call voice history information. When the telephone exchange processing unit 10 receives the hold request signal from one of the terminals 100 and 200, which are the call originating and call receiving terminals, it passes the stored call voice history information to the recognition analysis processing unit 20.

At this time, it is desirable that the telephone exchange processing unit 10 extract the call voice information about the call made between the user A of the terminal 100 and the user B of the terminal 200 right before the reception of the hold request signal from among the stored call voice history information items and pass the call voice information to the recognition analysis processing unit 20. The call voice information here is, for example, the call voice information related to the notification about holding the call or the call voice information related to an acknowledgement of the call hold notification, which is hold notification voice information for notifying the person on hold (e.g., the user B who is the customer) that the call will be put on hold by the person who is to put the call on hold (e.g., the user A). Further alternatively, the call voice information is response voice information for returning an acknowledgement from the person on hold (e.g., the user B) to the person who is to put the call on hold (e.g., the user A) in response to the hold notification voice information.

Then, the recognition analysis processing unit 20 may operate so as to identify and specify the language used by the person on hold (e.g., the user B who is the customer) based on the call voice information passed from the telephone exchange processing unit 10.

Further, in the above description, although the case where the telephone exchange 1000 is a private branch exchange installed in the company premises 400 has been described, the present disclosure is not limited to such a case. As long as the telephone exchange controls the incoming and outgoing telephone calls and the calls between the call originating and call receiving terminals, the telephone exchange may be installed in the public network 300 or may be any type of telephone exchange. As described above, in addition to the telephone exchange processing unit 10 that controls the entire processing, the telephone exchange may be configured to include at least a detection unit (the hold request detection unit 11) that detects the call hold request, the voice recognition module (the recognition analysis processing unit 20) that identifies the language used in the call at the call originating and call destination terminals, and the database (the hold tone database 30) that stores the hold tones including on-hold messages in various languages.

In such a telephone exchange, when it is detected that one of the call originating and call destination terminals, which are in the communicating state, has requested to put the call on hold, the telephone exchange may perform an operation of specifying the language used by the other one of the call originating and call destination terminals, which is the other party on the phone in the call with the one of the call originating and call destination, in the call right before the point when the hold request is detected and transmitting the hold tone including the on-hold message in the specified language to the other one of the call originating and call destination terminals.

(Description of Effects of Example Embodiment of the Present Disclosure)

As described above in detail, the following effects can be achieved in the example embodiment of the present disclosure. More specifically, for example, by implementing the recognition analysis processing unit 20 (i.e., the voice recognition module), which specifies the language of the call voice information, in the telephone exchange 1000 installed in the company premises 400, when the telephone exchange 1000 transmits the hold tone to the terminal 200 of the other party on the phone which accesses the terminal 100 used by the user A on the company side, i.e., the terminal 200 used by the user B on the customer side, it is possible to transmit, to the terminal 200 used by the user B on the customer side, the hold tone including the on-hold message in the language used in the call by the user B on the customer side in order to talk with the user A who is the user of the terminal 100 on the company side. Thus, when the content of the on-hold message included in the hold tone is, for example, the advertisement or business appeal of the company which has put the call on hold, the user B who is the customer and the person on hold can correctly understand the content of the on-hold message included in the hold tone.

More specifically, for example, when a call is put on hold for a short period of time during an international call with a foreigner staying in a foreign country or during a call with a foreigner staying in Japan at the front desk or reservation reception of a hotel, the on-hold message (e.g., a hotel promotion message, a message that promotes Japan's charms, or a message for sightseeing guidance) can be sent to the foreigner of the other party on the phone in the foreigner's native language, thereby improving the service quality of the hotel.

The configuration of the preferred example embodiment of the present disclosure has been described above. Note that such example embodiment is merely illustrative of the present disclosure and do not limit the present disclosure in any way. Those skilled in the art would easily understand that various modifications and variations are possible according to the specific application without departing from the scope of the present disclosure.

This application is based upon and claims the benefit of priority from Japanese patent application No. 2018-171061, filed on Sep. 13, 2018, the disclosure of which is incorporated herein in its entirety by reference.

REFERENCE SIGNS LIST

10 TELEPHONE EXCHANGE PROCESSING UNIT
11 HOLD REQUEST DETECTION UNIT
20 RECOGNITION ANALYSIS PROCESSING UNIT
30 HOLD TONE DATABASE
100 TERMINAL
200 TERMINAL
300 PUBLIC NETWORK
400 PREMISES
1000 TELEPHONE EXCHANGE

What is claimed is:

1. A telephone exchange comprising:
one or more processors;
a hold tone database configured to store hold tones including a plurality of on- hold messages in various languages in advance;
a memory storing executable instructions that, when executed by the one or more processors, causes the one or more processors to perform as:
   a telephone exchange processing unit that controls incoming and outgoing call operations of a call originating terminal and a call receiving terminal, controls a call between the call originating terminal and the call receiving terminal, and notifies one of the call originating terminal and the call receiving terminal of the hold tone, the call originating terminal and the call receiving terminal being in a communicating state;
   a recognition analysis processing unit that analyzes call voice information about the call between the call originating terminal and the call receiving terminal, which are in the communicating state, specifies a language used in the call voice information, and stores the language as language information; and
   a hold request detection processing unit that detects a hold request signal for requesting that the call to be held transmitted from one of the call originating terminal and the call receiving terminal, which are in the communicating state, wherein
when the hold request detection processing unit detects the hold request signal transmitted from one of the call originating terminal and the call receiving terminal, which are in the communicating state, the telephone exchange processing unit extracts, from the language information stored in the recognition analysis processing unit, the language used in the call between the call originating terminal and the call receiving terminal to which the hold request signal has been transmitted from the one of the call originating terminal and the call receiving terminal, selects, from the hold tone database the hold tone including the on-hold message in the language matching the language extracted, and transmits the selected hold tone to another one of the call originating terminal and the call receiving terminal, which is another party on the phone in the call with the one of the call originating terminal and the call receiving terminal, wherein
when there are a plurality of kinds of the languages used in the call between the call originating terminal and the call receiving terminal as the language information stored in the recognition analysis processing unit, the call being put on hold while the call originating terminal and the call receiving terminal are in the communicating state,
the language specified and stored at a time closest to a time when the hold request signal is detected is extracted.

2. A telephone exchange comprising:
one or more processors;
a hold tone database configured to store hold tones including a plurality of on-hold messages in various languages in advance;
a memory storing executable instructions that, when executed by the one or more processors, causes the one or more processors to perform as:
   a telephone exchange processing unit that controls incoming and outgoing call operations of a call originating terminal and a call receiving terminal, controls a call between the call originating terminal and the call receiving terminal, and notifies one of the call originating terminal and the call receiving terminal of the hold tone, the call originating terminal and the call receiving terminal being in a communicating state;
   a recognition analysis processing unit that analyzes call voice information about the call between the call originating terminal and the call receiving terminal, which are in the communicating state, specifies a language used in the call voice information, and stores the language as language information; and
   a hold request detection processing unit that detects a hold request signal for requesting that the call to be held transmitted from one of the call originating terminal and the call receiving terminal, which are in the communicating state, wherein
when the hold request detection processing unit detects the hold request signal transmitted from one of the call originating terminal and the call receiving terminal, which are in the communicating state, the telephone exchange processing unit
   extracts, from the language information stored in the recognition analysis processing unit, the language used in the call between the call originating terminal and the call receiving terminal to which the hold request signal has been transmitted from the one of the call originating terminal and the call receiving terminal,
   selects, from the hold tone database, the hold tone including the on-hold message in the language matching the language extracted, and transmits the selected hold tone to another one of the call originating terminal and the call receiving terminal, which is another party on the phone in the call with the one of the call originating terminal and the call receiving terminal, wherein the recognition analysis processing unit specifies the language used in the call between the call originating terminal and the call receiving terminal and stores the specified language as the language information based on the call voice information about the call between the call originating terminal and the call receiving terminal right before the hold request signal transmitted from one of the call originating terminal and the call receiving terminal, which are in the communicating state, is detected.

3. A hold tone notification method comprising:

a hold tone database configured to store hold tones including a plurality of on- hold messages in various languages in advance;

a telephone exchange processing that controls incoming and outgoing call operations of a call originating terminal and a call receiving terminal, controls a call between the call originating terminal and the call receiving terminal, and notifies one of the call originating terminal and the call receiving terminal of the hold tone, the call originating terminal and the call receiving terminal being in a communicating state;

a recognition analysis processing that analyzes call voice information about the call between the call originating terminal and the call receiving terminal, which are in the communicating state, specifies a language used in the call voice information, and stores the language as language information; and a hold request detection processing that detects a hold request signal for requesting that the call to be held transmitted from one of the call originating terminal and the call receiving terminal, which are in the communicating state, wherein when the hold request signal transmitted from one of the call originating terminal and the call receiving terminal, which are in the communicating state, is detected, in the hold request detection processing, in the telephone exchange processing, the language used in the call between the call originating terminal and the call receiving terminal to which the hold request signal has been transmitted from the one of the call originating terminal and the call receiving terminal is extracted from the language information stored in the recognition analysis processing, the hold tone including the on-hold message in the language matching the language extracted is selected from the hold tone database, and the selected hold tone is transmitted to another one of the call originating terminal and the call receiving terminal, which is another party on the phone in the call with the one of the call originating terminal and the call receiving terminal, wherein when there are a plurality of kinds of the languages used in the call between the call originating terminal and the call receiving terminal as the language information stored in the recognition analysis processing, the call being put on hold while the call originating terminal and the call receiving terminal are in the communicating state, the language specified and stored at a time closest to a time when the hold request signal is detected is extracted.

4. A hold tone notification method comprising:

a hold tone database configured to store hold tones including a plurality of on-hold messages in various languages in advance;

a telephone exchange processing that controls incoming and outgoing call operations of a call originating terminal and a call receiving terminal, controls a call between the call originating terminal and the call receiving terminal, and notifies one of the call originating terminal and the call receiving terminal of the hold tone, the call originating terminal and the call receiving terminal being in a communicating state;

a recognition analysis processing that analyzes call voice information about the call between the call originating terminal and the call receiving terminal, which are in the communicating state, specifies a language used in the call voice information, and stores the language as language information; and a hold request detection processing that detects a hold request signal for requesting that the call to be held transmitted from one of the call originating terminal and the call receiving terminal, which are in the communicating state, wherein when the hold request signal transmitted from one of the call originating terminal and the call receiving terminal, which are in the communicating state, is detected, in the hold request detection processing, in the telephone exchange processing, the language used in the call between the call originating terminal and the call receiving terminal to which the hold request signal has been transmitted from the one of the call originating terminal and the call receiving terminal is extracted from the language information stored in the recognition analysis processing, the hold tone including the on-hold message in the language matching the language extracted is selected from the hold tone database, and the selected hold tone is transmitted to another one of the call originating terminal and the call receiving terminal, which is another party on the phone in the call with the one of the call originating terminal and the call receiving terminal, wherein in the recognition analysis processing, the language used in the call between the call originating terminal and the call receiving terminal is specified, and the specified language is stored as the language information based on the call voice information about the call between the call originating terminal and the call receiving terminal right before the hold request signal transmitted from one of the call originating terminal and the call receiving terminal, which are in the communicating state, is detected.

5. A non-transitory computer-readable storage medium storing a hold tone notification program operated on a computer including a hold tone database configured to store hold tones including a plurality of on-hold messages in various languages in advance, the hold tone notification program causing the computer to execute:

a telephone exchange processing process of controlling incoming and outgoing call operations of a call originating terminal and a call receiving terminal, controlling a call between the call originating terminal and the call receiving terminal, and notifying one of the call originating terminal and the call receiving terminal of the hold tone, the call originating terminal and the call receiving terminal being in a communicating state;

a recognition analysis processing process of analyzing call voice information about the call between the call originating terminal and the call receiving terminal, which are in the communicating state, specifying a language used in the call voice information, and storing the language as language information; and a hold request detection processing process for detecting a hold request signal for requesting that the call to be held transmitted from one of the call originating terminal and the call receiving terminal, which are in the communicating state, wherein when the hold request signal transmitted from one of the call originating terminal and the call receiving terminal, which are in the communicating state, is detected, in the hold request detection processing process, in the telephone exchange processing process, the language used in the call between the call originating terminal and the call receiving terminal to which the hold request signal has been transmitted from the one of the call originating terminal and the call receiving terminal is extracted from the language information stored in the recognition analysis processing process, the hold tone including the on-hold message in the language matching the language extracted is selected from the hold tone database, and the selected hold tone is transmitted to another one of the call originating terminal and the call receiving terminal, which is another party on the phone in the call with the one of the call originating terminal and the call receiving terminal, wherein when there are a plurality of kinds of the languages used in the call between the call originating terminal and the call receiving terminal as the language information stored in the recognition analysis processing process, the call being put on hold while the call originating terminal and the call receiving terminal are in the communicating state, the language specified and stored at a time closest to a time when the hold request signal is detected is extracted.

6. A non-transitory computer-readable storage medium storing a hold tone notification program operated on a computer including a hold tone database configured to store hold tones including a plurality of on-hold messages in various languages in advance, the hold tone notification program causing the computer to execute:

a telephone exchange processing process of controlling incoming and outgoing call operations of a call originating terminal and a call receiving terminal, controlling a call between the call originating terminal and the call receiving terminal, and notifying one of the call originating terminal and the call receiving terminal of the hold tone, the call originating terminal and the call receiving terminal being in a communicating state;

a recognition analysis processing process of analyzing call voice information about the call between the call originating terminal and the call receiving terminal, which are in the communicating state, specifying a language used in the call voice information, and storing the language as language information; and a hold request detection processing process for detecting a hold request signal for requesting that the call to be held transmitted from one of the call originating terminal and the call receiving terminal, which are in the communicating state, wherein when the hold request signal transmitted from one of the call originating terminal and the call receiving terminal, which are in the communicating state, is detected, in the hold request detection processing process, in the telephone exchange processing process, the language used in the call between the call originating terminal and the call receiving terminal to which the hold request signal has been transmitted from the one of the call originating terminal and the call receiving terminal is extracted from the language information stored in the recognition analysis processing process, the hold tone including the on-hold message in the language matching the language extracted is selected from the hold tone database, and the selected hold tone is transmitted to another one of the call originating terminal and the call receiving terminal, which is another party on the phone in the call with the one of the call originating terminal and the call receiving terminal, wherein in the recognition analysis processing process, the language used in the call between the call originating terminal and the call receiving terminal is specified, and the specified language is stored as the language information based on the call voice information about the call between the call originating terminal and the call receiving terminal right before the hold request signal transmitted from one of the call originating terminal and the call receiving terminal, which are in the communicating state, is detected.

* * * * *